April 21, 1931.   F. L. MORSE ET AL   1,801,445
AUTOMATIC CONTROL FOR GARAGE DOORS
Filed Jan. 8, 1926
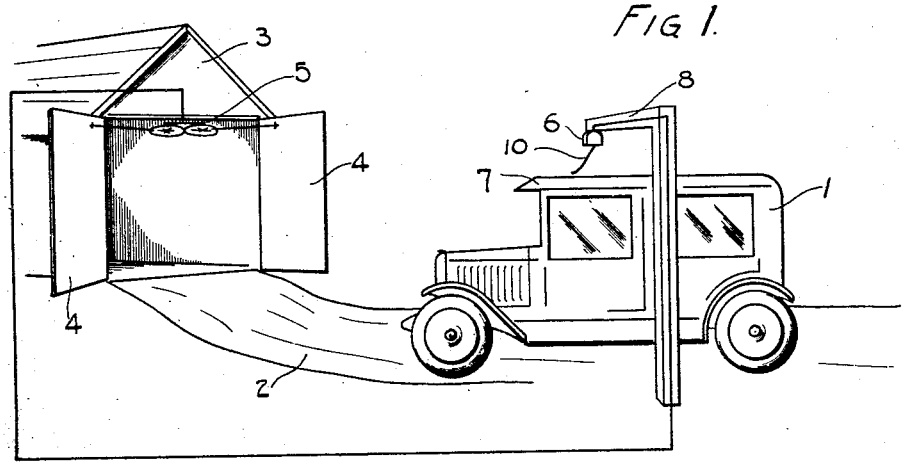
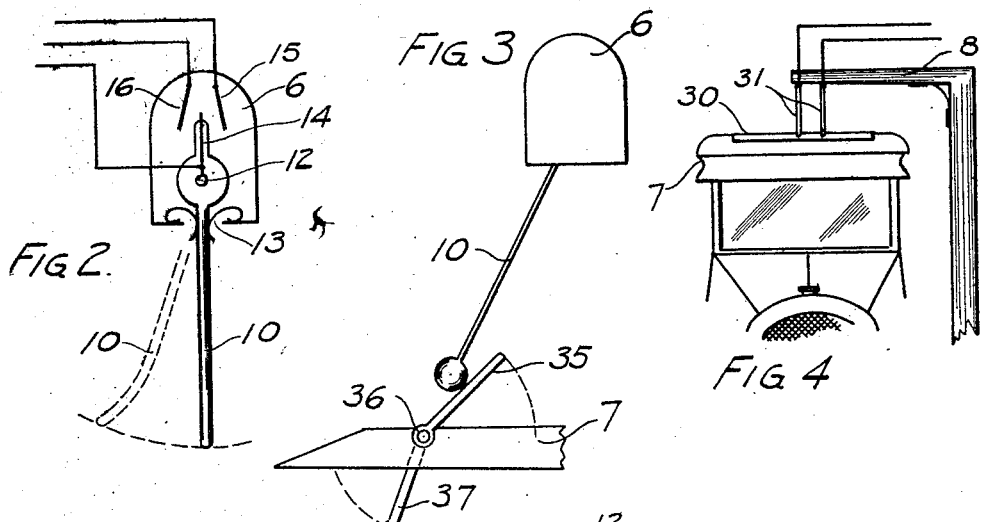
Frank L. Morse
Robert V. Morse
INVENTORS Patented Apr. 21, 1931

1,801,445

UNITED STATES PATENT OFFICE

FRANK L. MORSE AND ROBERT V. MORSE, OF ITHACA, NEW YORK

AUTOMATIC CONTROL FOR GARAGE DOORS

Application filed January 8, 1926. Serial No. 80,003.

This invention relates to automatic apparatus for opening and closing garage doors and gates, and has for its principal object the provision of a simple and practical type of control which can be actuated directly by the car itself, without the driver taking his hand from the wheel. Automatic doors have generally been operated by a manual push buttom switch at the side of the driveway, which necessitated opening the window of a closed car, and was somewhat inconvenient to operate. They have also been controlled by a plate in the driveway, operated by running the car upon it, but in that case the controlling mechanism was exposed to mud, ice, and snow, which affected its reliability. The objects of this invention are to overcome these difficulties and to make a convenient and practical control mechanism which will not be affected by the weather. Another object is to provide a system of direct car control which can automatically distinguish between a car leaving the garage and a car entering the garage. Another object is to provide a controller capable of operating at various car speeds without causing damage and which will not require the car to come to a stop. In general the purpose of our invention is to provide a simple, reliable, and fully automatic controller for electrically operated garage doors, either of the fully electric types or of the electrically controlled types involving compressed air or other power.

Referring now to the drawings, Fig. 1 is a general view of our control system, showing how the controller is actuated by contact with the top of the car body. Fig. 2 shows more in detail one form of the controller. Fig 3 shows a modified pendant arm. Fig. 4 illustrates another form of controller, involving an electric circuit made by a conductor on the car itself. Fig. 5 illustrates one means for preventing the tongue or arm from rubbing on the top of the car. Fig. 6 illustrates a modification of Fig. 5.

The fundamental characteristic of this invention is the use of the upper part or top of the car body as the actuating element by which the automatic electric control is initiated. Referring first to Fig. 1, which illustrates the general principles of the invention, an automobile 1 is shown in the driveway 2 preparing to enter the garage 3, which is equipped with doors 4 operated by an electric or electro-pneumatic door operating mechanism 5. Our invention is not limited to any particular type of electric door mechanism, of which there are a large number on the market or known to the art, but can be applied to any of the types which are actuated by the momentary closing of an electric circuit, as by a push button. Instead of the push button located at the side of the driveway to be reached by hand, or in the ground to be run over by the car, we provide a control apparatus 6 adapted to act in conjunction with the top 7 of the car to operate the controlling circuit when the car comes in contact with it. The overhead control device may be carried by a frame 8 which overhangs the driveway, or where there is a covered entrance passage it may be supported by the ceiling. In any case it should be at some distance from the door in order to diminish the liability of accidents. When an automobile is entering the garage the top 7 of the car swings an arm 10 of the apparatus 6 in one direction, operating the switch to open the garage doors; and when the car is leaving the garage the arm 10 swings in the other direction, operating the switch to close the garage doors, as will be described more in detail. When one is not in the car, the doors are operated in the usual manner by handbuttons or other suitable switches.

One illustrative form of the control apparatus 6 is shown in Fig. 2. In this illustration the pendant arm 10 is made of rubber or other flexible material which will not injure the top of the car as it rubs across it. This arm 10 is sufficiently long and sufficiently flexible so that it will adjust itself to various heights of cars. A light rigid arm 10′ may be used instead of the rubber hose type 10, but in that case it should be provided with a rounded or ball tip as shown in Fig. 3 so as not to rip the top 7 of the car in case it reverses when partly under. The arm 10 or 10′ (hereinafter referred to generally as the arm 10) is mounted so that it may swing about the pivot 12 carried by the frame 8, the arm 10 normally being held in the vertical position by gravity, aided if necessary by a spring device 13, which tends to return the arm to the central position when displaced. As the arm is swung in one direction a part 14 actuates an electric switch 15, which is wired to the door operating mechanism 5 inside the garage 3 in the same manner as the usual opening button, so that the doors are opened thereby. If the arm 10 is swung in the opposite direction, it actuates the electric switch 16, which is wired to the door mechanism 5 in the same manner as the usual closing button. Thus as the car drives toward the garage the doors are opened, and as it drives away the doors are closed. The double switch construction 15 and 16 described applies to the types of door operating mechanisms most frequently used, both electric and electro-pneumatic, in which one push button or switch is used to open the doors and another push button or switch is used to close the doors. There are, however, types of door operators on the market in which the same button or switch is used to both open and close the doors. These mechanisms generally reverse the motion mechanically without reversing the direction of rotation of the electric motor itself, or provide automatic means for reversing the motor at the end of an operation, so that only one operating switch or button is necessary, it being pressed to open the doors when they are closed or to close them when they are open. With mechanisms when such single button controls are used, the switches 15 and 16 described are wired in parallel, so as to form in effect one switch, in order that either one performs the function of the single button; or a single switch operated from either direction may be used. In this case the doors will perform the next operation in their cycle whichever way the car passes under the controller 6.

In some cases the repeated rubbing of the arm of the overhead control tends to wear a hole in the top of the automobile. If a dash pot or momentary detaining member is connected to the swinging arm 10 it not only steadies the arm when not in use but also serves to protect the top of the car from undue wear in the following manner. As the automobile strikes the arm 10 it tends to knock it higher than the top 7 of the car. A dash pot or momentary detaining member restrains the arm 10 from falling back too quickly, so that if the car continues moving it may pass under the arm 10 before the arm touches the top 7 again. Various forms of dash pots, momentary detents, and similar mechanisms may be used, one illustrative form being shown in Fig. 5, in which the pivot 12 carrying the arm 10 also carries the vane or piston 20 which oscillates in the chamber or cylinder 21. The chamber 21 contains a suitable fluid, which may be air, or a liquid, and when the piston 20 is thrown to one end of the chamber 21 the fluid escapes around the piston or by small orifices to the other side of the chamber 21. When the vane or piston 20 starts to move back to its normal position a suction is created which gradually draws the fluid back and allows the vane or piston 20 to sink to its normal position. Thus the arm 10 when once struck by the top will usually clear the top of the car while it passes underneath. A modified form of momentary detent is shown in Fig. 6, in which the arm 10 has attached to it a cage or race 25 having a transverse groove or depression 26 in the bottom thereof. On either side of this depression 26 the walls 27 curve away in a substantially arcuate manner, the curves either having the pivot 12 as a center or differing somewhat from circular arcs if desired. A ball or a roller 28, preferably of metal or some other material having considerable inertia, normally rests in the depression 26 when the arm 10 is vertical, but when the arm 10 is struck by the car the sudden motion causes the ball or roller 28 to jump out of the depression 26 and roll back toward a corner of the cage 25. If the arm 10 is fairly well balanced in the manner of a physical pendulum, it will return rather slowly to the vertical position, especially as this involves a reversal of the rotation of the roller 28. This may be accentuated if desired by making the ball or roller 28 hollow and partially filling it with smaller balls or shot. When the arm 10 has finally returned nearly to the central position the ball or roller 28 drops into the depression 26, where it then exerts a more definite force to hold the arm 10 vertical.

In the foregoing we have described the arm 10 as striking the top of the automobile. It will be obvious that it may also be arranged with the arm 10 wholly or partially horizontal so that it will strike the side of the body of the car. In the specification and claims the words "top of the car," "top of the vehicle," "upper body portion," and words of similar import should be understood to mean any portion of the upper part of an automobile body or anything attached thereto, as for example the lever 35 in Fig. 3, which is pivoted at 36 to the top 7, and can be raised to intercept the arm 10 by operating a handle 37, which may be conveniently located inside the car body 1 where the driver can reach it.

In the example illustrated in Fig. 4 the circuit of the overhead switch is completed by a conductor 30 which is permanently mounted on the top of the car 7. In this case there are suspended from the overhead frame 8 two or more conductors 31, which may be flexible metal strips, or wires, or more rigid like the arm 10 for example. These conductors 31 are normally insulated from each other, but when the top of the car 7 carrying a conductor strip 30 comes in contact with them a circuit is completed between them which serves to initiate the action of the door operating mechanism in the same manner as though a switch button has been pressed. With this type the door mechanism will only respond to a vehicle which has been equipped with the conductor 30 (which may be of any shape), and the doors will not open for any other vehicle. The conductor 30 should be insulated from the vehicle or at least from the ground, and this is normally accomplished by the rubber tires of the automobile. It is not of course necessary to use a very high voltage in this control circuit. It is desirable to have the vehicle insulated from the ground in any case of electric control, even of the mechanical arm type first described.

In the foregoing we have described means for automatically opening and closing garage doors which do not require the driver to reach his hand out of his car, and yet are not affected by rain, snow or mud in the driveway. While we have explained our type of control by certain specific examples, it will be understood that these are only by way of illustration, and that the apparatus is susceptible to various modifications and adaptations as will be apparent to those skilled in the art, without departing from the scope of our invention, which is specified in the following claims.

1. In an automatic door operator, the combination of a door, electrically controlled mechanism for operating said door, a pair of electric control switches for said mechanism, one of said switches being arranged to open the door and one being arranged to close it, an oscillating member for actuating said switches, said member being supported in the path of the upper part of vehicles using said door, and said member being arranged so that it will be moved one way to actuate the opening switch when the member comes in contact with a vehicle approaching said door, and moved the other way so as to actuate the closing switch when the member comes in contact with a vehicle moving away from the door.

2. In an automatic door operator, the combination of a door, electrically controlled mechanism for operating said door, a pair of electric control switches for said mechanism, one of said switches being arranged to open the door and one being arranged to close it, a flexible member for actuating said switches, said member being supported in the path of the upper part of vehicles using said door, and said member being arranged so that it will be moved one way to actuate the opening switch when the member comes in contact with a vehicle approaching said door, and moved the other way so as to actuate the closing switch when the member comes in contact with a vehicle moving away from the door.

3. In an automatic door operator, the combination of a door, electrically controlled mechanism for operating said door, a pair of electric control switches for said mechanism, one of said switches being arranged to open the door and one being arranged to close it, an oscillating member for actuating said switches, said member being supported in the path of the upper part of vehicles using said door and at a greater distance from said door than one-half the width of the door opening, and said member being arranged so that it will be moved one way to actuate the opening switch when the member comes in contact with a vehicle approaching said door, and moved in the other way so as to actuate the closing switch when the member comes in contact with a vehicle moving away from the door.

4. In an automatic door operator, the combination of a door, electrically controlled mechanism for operating said door, a control switch for said mechanism, a member for actuating said switch, said member being supported in the path of the upper part of vehicles using said door, and means for holding said member temporarily out of contact when after it has first been struck by the vehicle, whereby the rubbing of the member on the vehicle may be reduced.

5. In an automatic door operator, the combination of a door, electrically controlled mechanism for operating said door, a control switch for said mechanism, a member for actuating said switch, said member being supported in the path of the upper part of vehicles using said door, and yieldable means for steadying said member, said yieldable means being arranged to permit the said member to move away when struck from its normal position, and to restrain said member from returning quickly to its normal position, whereby the rubbing of the member on passing vehicles may be reduced.

6. In an automatic door operator, the combination of a door, electrically controlled mechanism for operating said door, a control switch for said mechanism, a member for actuating said switch, said member being supported in the path of the upper part of vehicles using said door, and a displaceable means for steadying said member, said means being displaced when said member is moved strongly, but retaining its steadying function for lighter forces.

7. Means for operating garage doors, comprising the combination of a door, a power actuated door operating mechanism attached to said door, an electric switch controlling said mechanism to open said door, an electric switch controlling said mechanism to close said door, an automobile having a body, a member located at a height above the ground less than the height of the door and greater than half the height of the automobile and extending a sufficient distance so that it may come in contact with automobiles at various distances, said member being arranged to operate the door opening switch when it is struck by an automobile approaching the door, and arranged to operate the door closing switch when struck by an automobile leaving said door, whereby the door may be actuated by the upper part of an automobile striking said member.

8. Means for operating garage doors, comprising the combination of a door, a power actuated door operating mechanism attached to said door, an electric switch controlling said mechanism to open said door, an electric switch controlling said mechanism to close said door, an automobile having a body, a flexible member located at a height above the ground less than the height of the door and greater than half the height of the automobile and extending a sufficient distance so that it may come in contact with automobiles at various distances, said member being arranged to operate the door opening switch when it is struck by an automobile approaching the door, and arranged to operate the door closing switch when it is struck by an automobile leaving said door, whereby the door may be actuated by the upper part of an automobile striking said member.

9. Means for operating garage doors, comprising the combination of a door, a power actuated door operating mechanism attached to said door, an electric switch controlling said mechanism to open said door, an electric switch controlling said mechanism to close said door, an automobile having a body, a member located at a height above the ground less than the height of the door and greater than half the height of the automobile and extending a sufficient distance so that it may come in contact with automobiles at various distances, said member having a rounded portion where it comes in contact with the car body, said member being arranged to operate the door opening switch when it is struck by an automobile approaching the door, and arranged to operate the door closing switch when struck by an automobile leaving said door, whereby the door may be actuated by the upper part of an automobile striking said member.

10. Means for operating garage doors, comprising the combination of a door, a power actuated door opening mechanism attached to said door, an electric switch controlling said mechanism, an automobile having a body, a member for operating said switch, said member being located at a height above the ground less than the height of the door and greater than half the height of the automobile, and extending a sufficient distance so that it may come in contact with automobiles at various distances, whereby the door may be actuated by the upper part of an automobile striking the member, and means for momentarily holding said member out of contact with the automobile after it is struck.

11. Means for operating garage doors, comprising the combination of a door, a power actuated door operating mechanism attached to said door, an electric switch controlling said mechanism to open said door, an electric switch controlling said mechanism to close said door, an automobile having a body, a member located at a height above the ground less than the height of the door and greater than half the height of the automobile and extending a sufficient distance so that it may come in contact with automobiles at various distances, said member having a rounded portion where it comes in contact with the car body, said member being arranged to operate the door opening switch when it is struck by an automobile approaching the door, and arranged to operate the door closing switch when struck by an automobile leaving said door, whereby the door may be actuated by the upper part of an automobile striking said member, and means for momentarily holding said member out of contact with the car body after it is struck.

12. Means for operating garage doors, comprising the combination of an automobile, a movable member mounted on the upper part of said automobile, means for extending said member, an arm adapted to be actuated by said member as the automobile carries the member past the arm, a switch controlled by said arm, and an electrically controlled door opening mechanism actuated by said switch, whereby the door may be automatically operated by the motion of the vehicle.

13. Means for operating garage doors, comprising the combination of an automobile, a movable member mounted on the upper part of said automobile, means for extending said member, an arm adapted to be actuated by said member, a switch controlled by said arm, and an electrically controlled door opening mechanism actuated by said switch, whereby the door may be automatically operated.

In witness whereof we have hereunto set our hands this 5th day of January, 1926.

FRANK L. MORSE.
ROBERT V. MORSE.